United States Patent
Myers et al.

(10) Patent No.: US 12,371,273 B2
(45) Date of Patent: Jul. 29, 2025

(54) RIP DETECTION SYSTEM FOR A CONVEYOR BELT

(71) Applicant: Fenner Dunlop Americas, LLC, Coraopolis, PA (US)

(72) Inventors: Mark Myers, Bland, VA (US); Douglas Nason, Fremont, OH (US); Alan Levesley, Anderson, SC (US); Geoff Normanton, Toccoa, GA (US)

(73) Assignee: FENNER DUNLOP AMERICAS, LLC, Coraopolis, PA (US)

( * ) Notice: Subject to any disclaimer, the term of this patent is extended or adjusted under 35 U.S.C. 154(b) by 90 days.

(21) Appl. No.: 18/304,258

(22) Filed: Apr. 20, 2023

(65) Prior Publication Data

US 2023/0339694 A1    Oct. 26, 2023

Related U.S. Application Data

(60) Provisional application No. 63/363,286, filed on Apr. 20, 2022.

(51) Int. Cl.
*B65G 43/02* (2006.01)
*G01N 27/20* (2006.01)

(52) U.S. Cl.
CPC .............. *B65G 43/02* (2013.01); *G01N 27/20* (2013.01)

(58) Field of Classification Search
None
See application file for complete search history.

(56) References Cited

U.S. PATENT DOCUMENTS

| | | | |
|---|---|---|---|
| 3,651,506 A | | 3/1972 | Olaf et al. |
| 4,296,855 A | * | 10/1981 | Blalock .................. B29C 70/22 |
| | | | 428/408 |
| 5,595,284 A | * | 1/1997 | Takahashi .............. D02G 3/447 |
| | | | 198/847 |
| 6,352,149 B1 | | 3/2002 | Gartland |
| 6,715,602 B1 | | 4/2004 | Gartland |
| 7,909,719 B2 | * | 3/2011 | Leighton ................ B65G 15/38 |
| | | | 474/264 |
| 8,618,929 B2 | | 12/2013 | Ganapathy et al. |
| 9,252,482 B2 | | 2/2016 | Konanur et al. |
| 2005/0024290 A1 | | 2/2005 | Aisenbrey |
| 2012/0217132 A1 | | 8/2012 | Twigger et al. |

* cited by examiner

*Primary Examiner* — Kavel Singh
(74) *Attorney, Agent, or Firm* — Shumaker, Loop & Kendrick, LLP; James D. Miller

(57) ABSTRACT

A rip detection system for a conveyor belt comprises at least one antenna and at least one sensing system. The at least one antenna comprises one or more continuous loops formed from at least a conductive fiber material. The at least one sensing system may include a transmitter, a receiver, a controller, and a power source. The at least one sensing system is configured to sense a conductivity of the at least one antenna. Based upon the sensed conductivity of the at least one antenna, the rip detection system determines a state of the conveyor belt.

10 Claims, 15 Drawing Sheets

| BELT WIDTH [mm] | SENSOR LOOP [mm] Width x Length x Thickness | REFERANCE NUMBER 534- |
|---|---|---|
| 650 | 600x320x2.5 | 5533 |
| 800 | 750x320x2.5 | 5540 |
| 1000 | 950x320x2.5 | 5557 |
| 1200 | 1150x320x2.5 | 5564 |
| 1400 | 1350x320x2.5 | 5571 |
| 1600 | 1550x320x2.5 | 5588 |
| 1800 | 1750x320x2.5 | 5595 |
| 2000 | 1950x320x2.5 | 5605 |
| 2200 | 2150x320x2.5 | 5612 |
| 2400 | 2350x320x2.5 | 5629 |
| 2600 | 2550x320x2.5 | 5636 |
| 2800 | 2750x320x2.5 | 5643 |
| 3000 | 2950x320x2.5 | 5650 |
| 3200 | 3150x320x2.5 | 5667 |
| [inch] | Width x Length x Thickness | 534- |
| 36 | 865x320x2.5 | 5485 |
| 38 | 915x320x2.5 | 5492 |
| 42 | 1017x320x2.5 | 5351 |
| 48 | 1170x320x2.5 | 5416 |
| 50 | 1220x320x2.5 | 5502 |
| 54 | 1322x320x2.5 | 5519 |
| 56 | 1372x320x2.5 | 5526 |
| 60 | 1474x320x2.5 | 5344 |
| 68 | 1677x320x2.5 | 5461 |
| 72 | 1779x320x2.5 | 5478 |
| 84 | 2084x320x2.5 | 5400 |

FIG. 2

Cable/Yarn tests

| Material | Diameter (in) | Tensile Strength (kN) | Pullout (kN) | % surviving flex | Ave mΩ Change after Flex |
|---|---|---|---|---|---|
| Stainless steel | 0.060 | 2.20 | 1.21 | 40 | 3200* |
| Brass Coated Steel | 0.051 | 1.86 | 2.38 | 100 | 686 |
| Conductive Yarn | 0.044 | 2.01 | 1.57 | 100 | 6116 |

*samples with unbroken cable

FIG. 18

| Conductive Yarn | Resistance before flex test | Resistance after flex test |
|---|---|---|
| 1 | 33.3 mΩ | 530 mΩ (.53 Ω) |
| 2 | 34.5 mΩ | 13600 mΩ (13.6 Ω) |
| 3 | 84.2 mΩ | 4370 mΩ (4.37 Ω) |

| Stainless Steel cable | Resistance before flex test | Resistance after flex test |
|---|---|---|
| 4 | 2.34 Ω | broken Leads |
| 5 | 193.4 mΩ | broken Leads |
| 6a | 184 mΩ | 158 mΩ |
| 6b | 152 mΩ | nothing registers (broken inside sample) |
| 6c | 213 mΩ | 3.27 Ω (3270 mΩ) |

| Brass Coated Cable | Resistance before flex test | Resistance after flex test |
|---|---|---|
| 7 | 87.5 mΩ | 882 mΩ |
| 8 | 67.4 mΩ | 1107 mΩ |
| 9 | 51.4 mΩ | 274 mΩ |

FIG. 19

| Pullout Test (kN/50mm) | | | |
|---|---|---|---|
| sample | Conductive yarn | Stainless Steel Cable | Brass coated cable |
| 1 | 1.74 | 1.20 | 2.36 |
| 2 | 1.41 | 1.28 | 2.34 |
| 3 | 1.56 | 1.16 | 2.43 |
| Ave | 1.57 | 1.21 | 2.38 |

FIG. 20

RIP DETECTION SYSTEM FOR A CONVEYOR BELT

CROSS-REFERENCE TO RELATED APPLICATION

This application claims the benefit of U.S. Provisional Patent Application Ser. No. 63/363,286 filed Apr. 20, 2022, the entireties of which are herein incorporated by reference.

FIELD OF THE INVENTION

The invention relates to a system for monitoring an industrial conveyor belt system, and more particularly to a rip panel for use in detecting a longitudinal rip in a conveyor belt and a system that employs such a panel.

BACKGROUND

Conveyor belts and conveyor systems are widely used in the transport of a variety of materials and products. Conveyor belts may be used in light or heavy materials transport. For heavy materials transport, the conveyor belts often have reinforcing cords of steel or other material embedded in the belt to provide additional tensile strength. For lighter material transport, such reinforcing cords may be formed of lighter weight non-metallic fibers or cords. In some applications no reinforcing cords are used.

Rip damage can arise in any of these belts during operation. For example, such a rip can occur when the belt is penetrated by an object which has become jammed so that it does not move with the belt. As the belt is driven forcibly against the object that penetrates the belt, a longitudinal rip may develop rapidly along an extended portion of the belt. Such a condition can render the belt unsuitable for the continued transport of material so that the belt must be taken out of service. In extreme cases, the entire belt may require replacement. In other cases, only the damaged section must be repaired. As will be appreciated, this can result in substantial financial losses due to the cost of belt repair or replacement, as well as the costly suspension of manufacturing or other operations which rely on continued operation of the conveyor system.

Various attempts have been made to provide a rip detection system which can promptly stop operation of a conveyor belt if a rip has occurred. One such prior assembly is shown diagrammatically in FIGS. 1 and 2 U.S. Pat. Appl. Pub. No. 2012/0217132, hereby incorporated herein by reference in its entirety. The assembly includes a conveyer belt 2 and hopper 10. Transmitters 5 and receivers 7 are mounted above the belt 2 near loading or discharge sections where most rips in the belt 2 occur. Antenna 3 are embedded intermittently throughout the conveyor belt 2. The control box 9 receives power from power source box 11 and sends a signal through the transmitters 5 to each antenna 3 as it passes by the transmitter 5. The signal passes through the antenna 3 back to the receiver 7 and the control box 9. The control box 9 receives the signal and evaluates the message. If the signal does not reach the receiver 7, it means a belt tear has interrupted current flow through the antenna 3. Lack of a transmitted signal indicates that damage has occurred to the belt 2, and the power to the belt 2 is shut off by the control box 9 accordingly. Rip detection loops may be vulcanized into the belt during normal production. These can be positioned in both steel cord and textile conveyor belting although the steel cable belt predominates here as they are more prone to ripping and tearing between cables. They are placed in the belt at intervals of 100 to 200 ft. but can be longer or shorter depending upon the customers risk tolerance. The panels were originally manufactured from Steel or Stainless Steel.

There are shortcomings, however, to such prior rip detection systems. Only one type of information is provided—signal or lack of a signal. Gradual decrease in signal strength, which could provide useful information as to belt wear, for example, is not detectable. For prior systems to operate effectively, the transmitters and receivers must be positioned a precise distance from the antennae and control box during belt operation; and in loading and discharge sections of the conveyor belt, material may easily collide with the nearby transmitter(s) and/or receiver(s) causing them to become misaligned with the antennae or to cease functioning altogether. Additionally, the transmitters, receivers, and their corresponding electrical connections can fail or become undependable over time. Down time of the conveyor belt frequently occurs as a result.

There is, therefore, a need for an improved rip detection system for a conveyor belt that is cost effective, reliable, and does not impact a function of the conveyor belt.

SUMMARY OF THE INVENTION

Consistent and consonant with an embodiment of the present invention, an improved rip detection system for a conveyor belt that is cost effective, reliable, and does not impact a function of the conveyor belt is surprisingly discovered.

In one embodiment, an antenna, comprises: at least one loop formed from at least a fiber material.

As aspects of some embodiments, the fiber material is conductive.

In another embodiment, a method of producing an antenna, comprises: providing a fiber material; and forming the fiber material into at least one loop.

In another embodiment, a rip detection system for a conveyor belt system, comprises: at least one antenna configured to be coupled to a conveyor belt, wherein the at least one antenna is formed from at least a conductive fiber material; and at least one sensing system configured to detect a conductivity of the at least one antenna.

As aspects of some embodiments, the at least one sensing system includes a controller configured to determine a state of the conveyor belt.

In yet another embodiment, a method of producing a rip detection system for a conveyor belt system, comprises: providing a conveyor belt; providing at least one antenna formed from at least a conductive fiber material; and coupling the at least one antenna to the conveyor belt.

As aspects of some embodiments, the method further comprises providing at least one sensing system configured to sense a conductivity of the at least one antenna to determine a state of the conveyor belt.

BRIEF DESCRIPTION OF THE DRAWINGS

Further details, features and advantages of configurations of the invention emerge from the following description of exemplary embodiments with reference to the associated figures:

FIG. 2 is a table showing sample belt width and sensor loop dimensions;

FIG. 15-20 show testing equipment, information and data for a conductive fiber loop used to produce the antenna of the rip detection system.

DETAILED DESCRIPTION OF THE INVENTION

Figure 1:
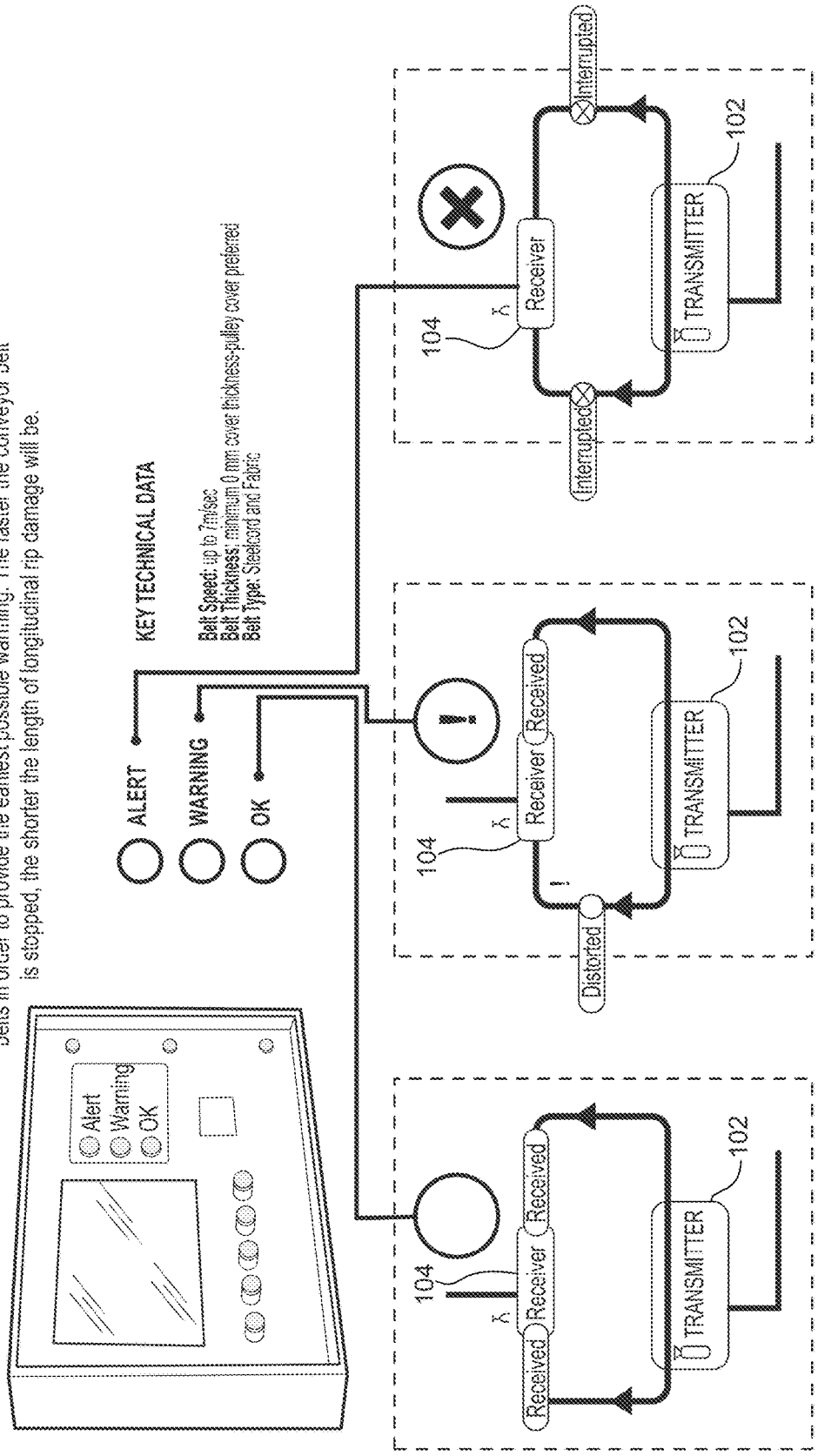
FIG. 1 is a schematic illustration of a signal detection system according to an embodiment of the present disclosure, wherein belt speeds, belt thicknesses, and belt types are exemplary in nature and do not limit the scope of the invention.
Figure 3:
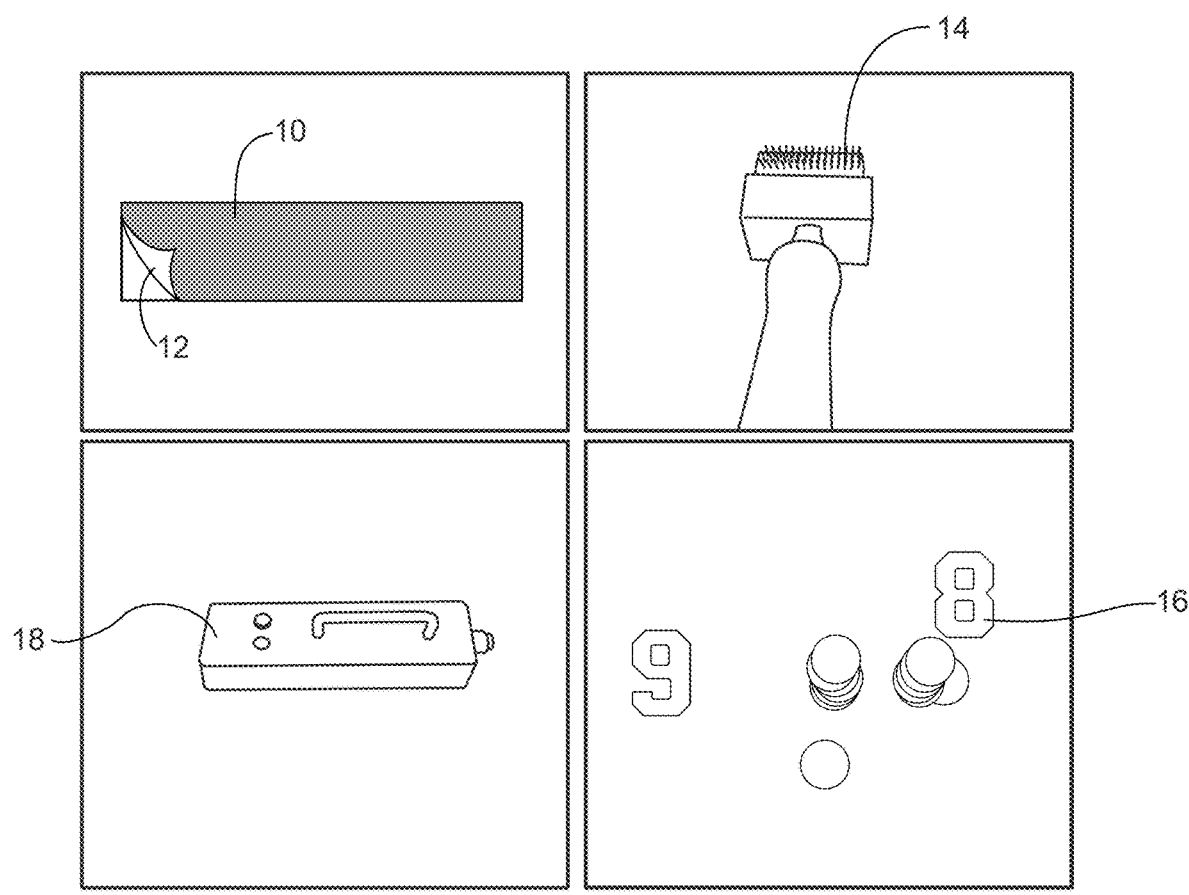
FIGS. 3-13 show a method of producing a rip detection system for a conveyor belt according to an embodiment of the disclosure.
Figure 4:
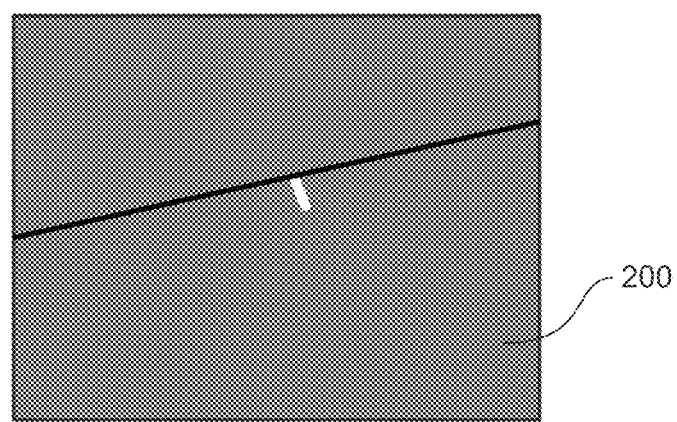
Figure 5:
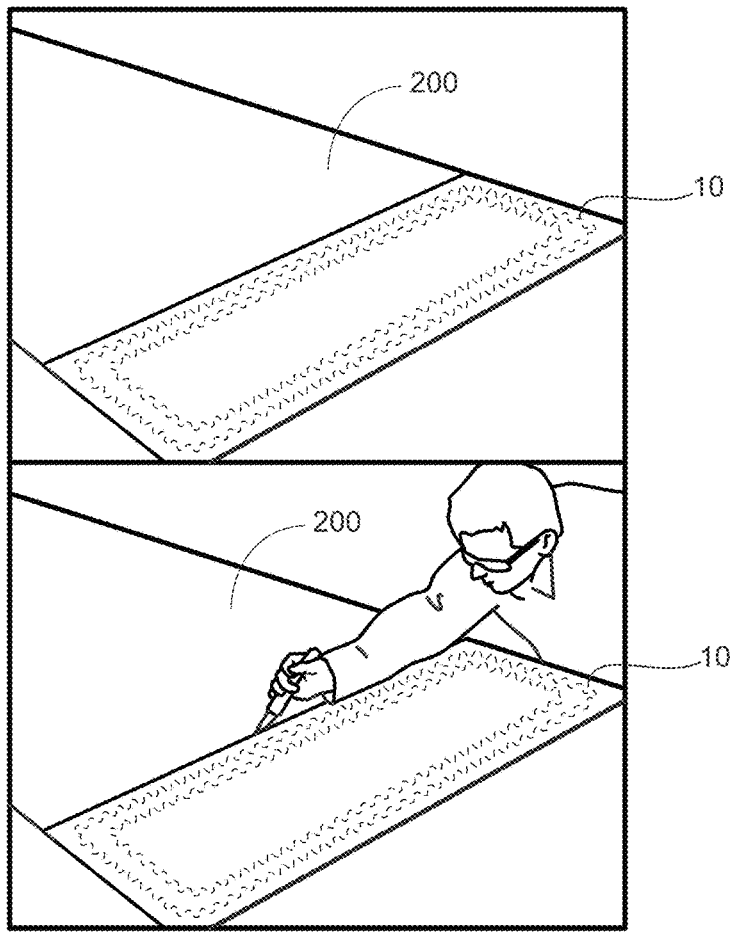
Figure 6:
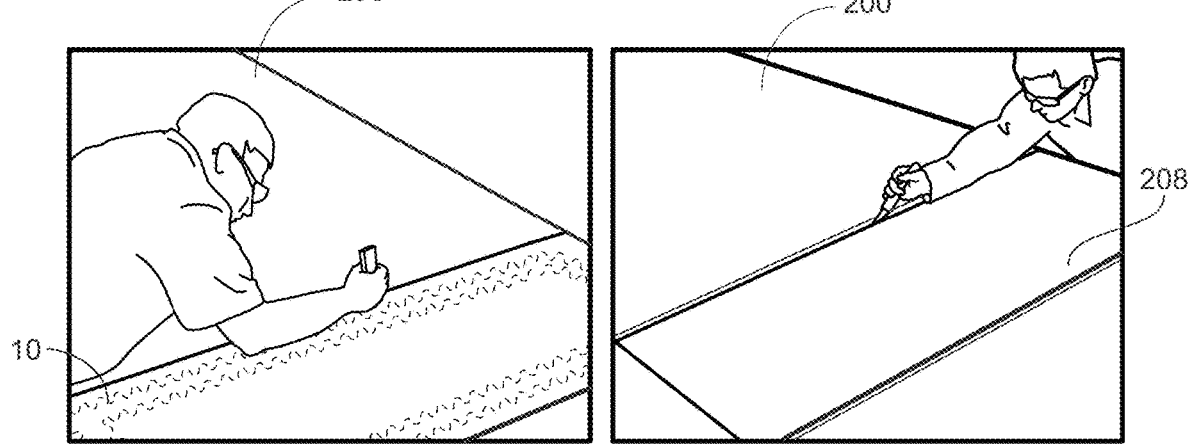
Figure 7:
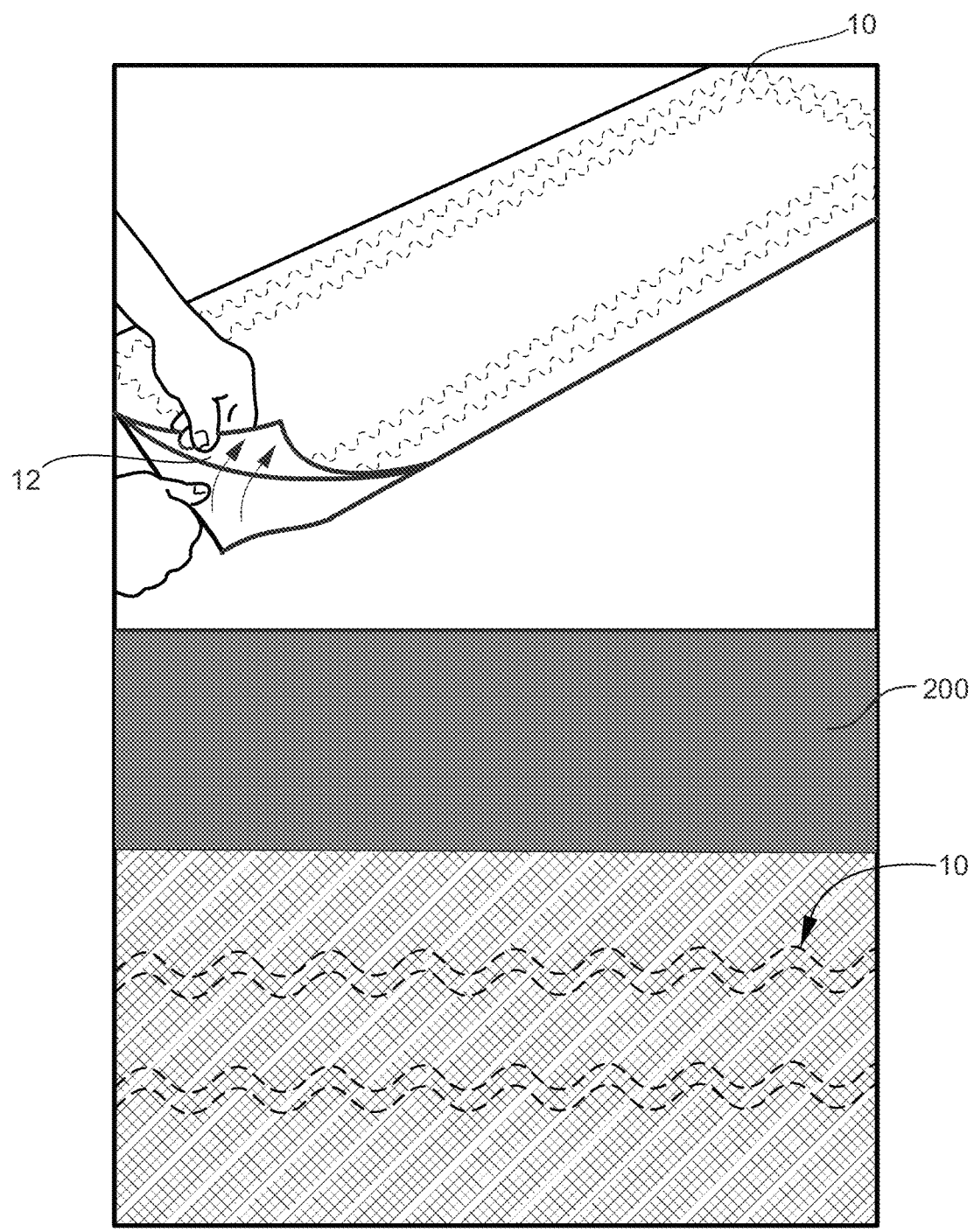
Figure 8:
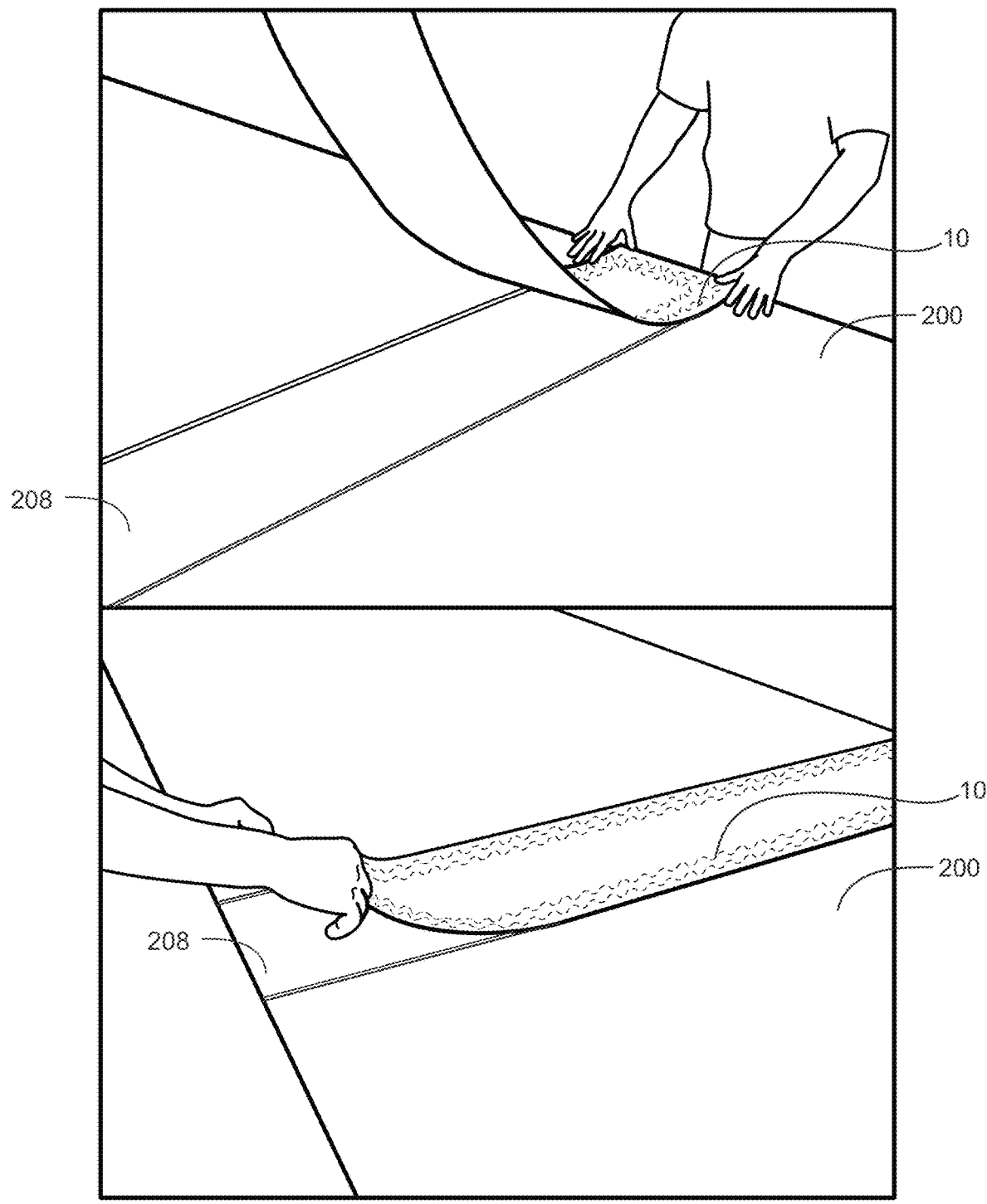
Figure 9:
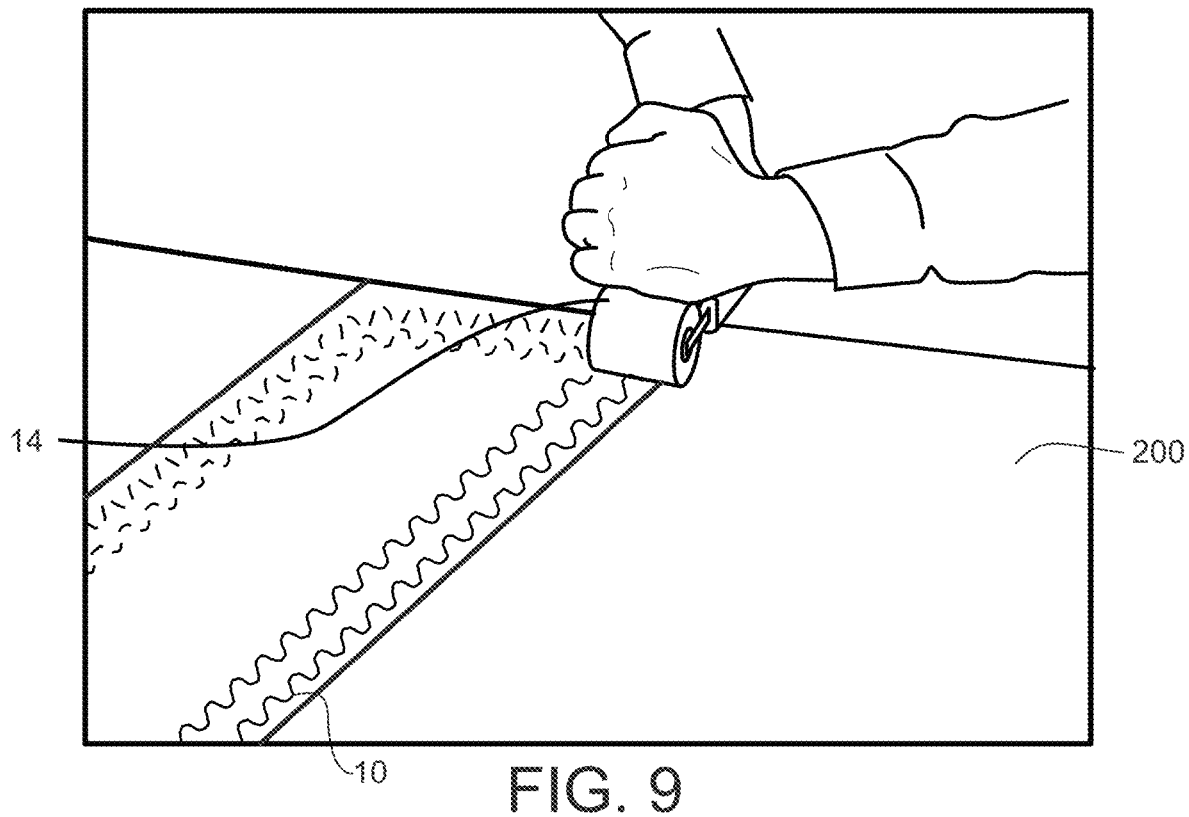
Figure 10:
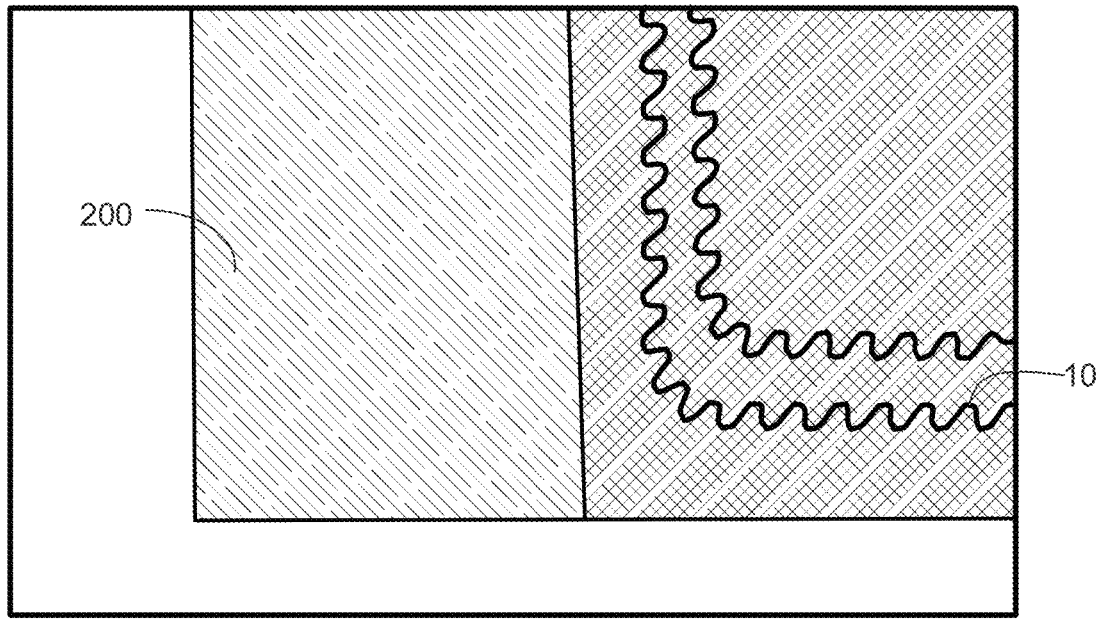
Figure 11:
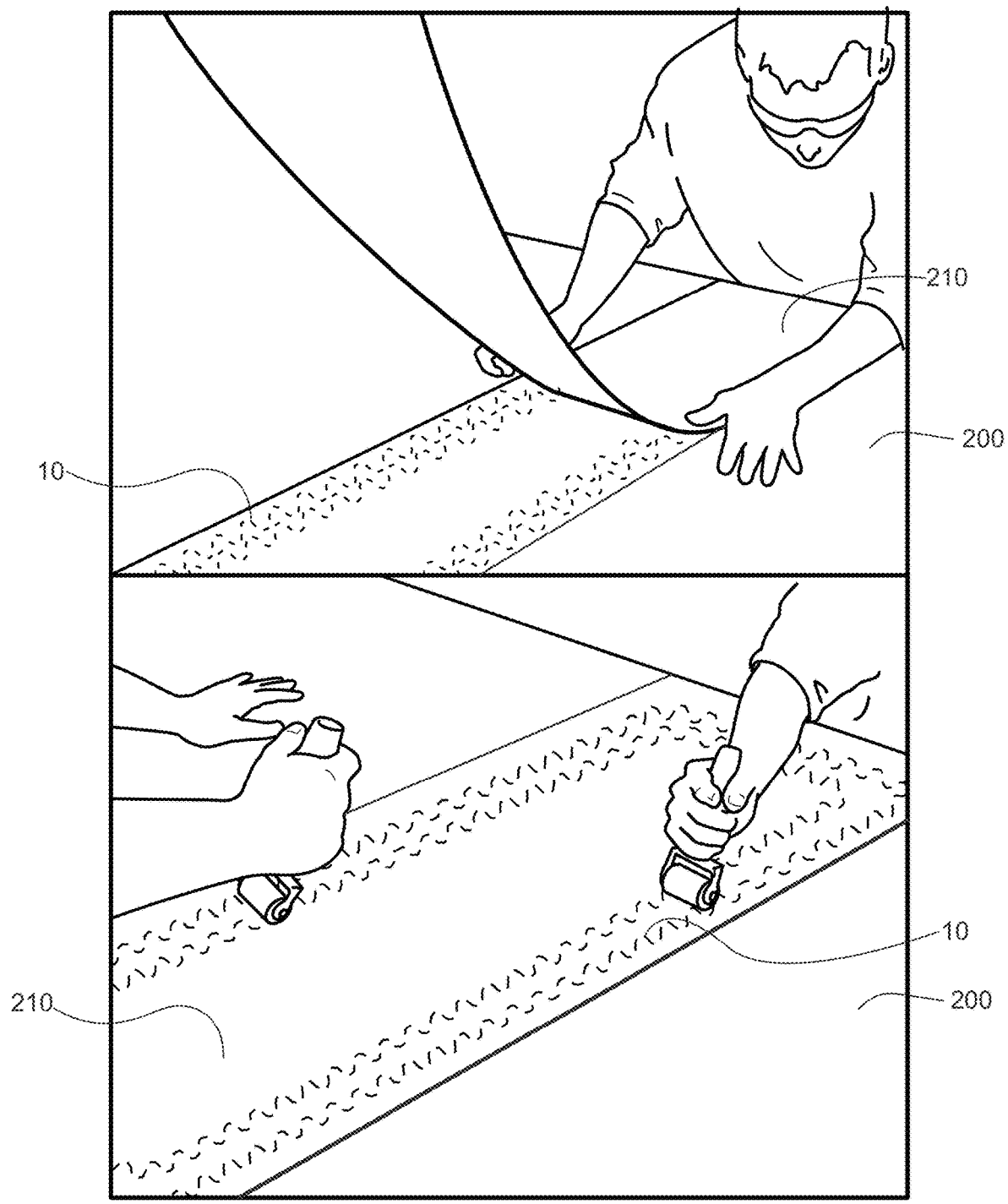
Figure 12:
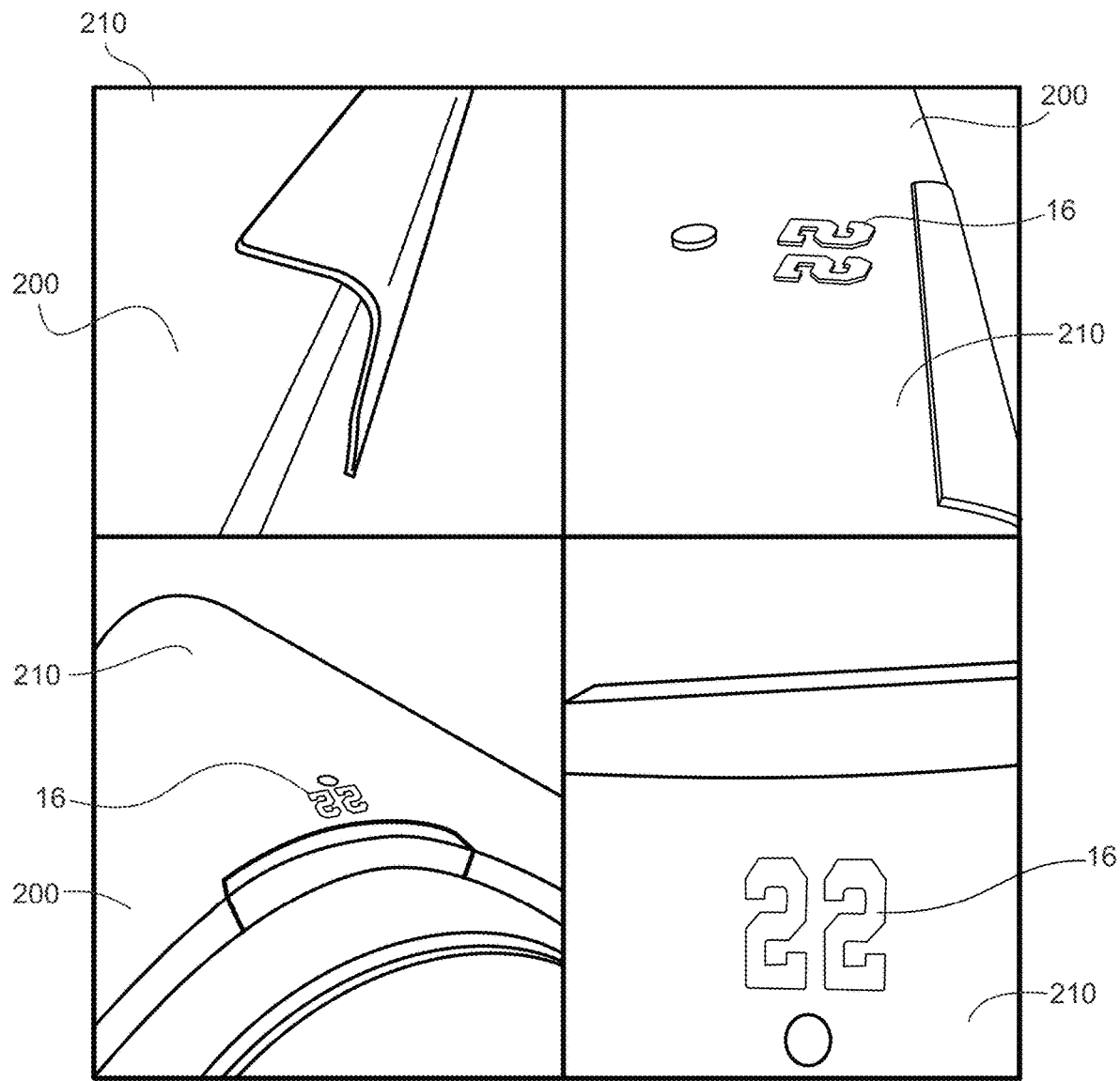

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Described hereinbelow with respect to FIGS. 1-21 is an antenna 10 for a signal detection system of a rip detection system 100 for a conveyor belt 200 according to an embodiment of the disclosure.

For exemplary purposes, a sample insertion procedure is described hereinbelow and illustrated in the appended drawings. The antenna 10 is provided as inductive loops or coils. A material used to produce the antenna is a conductive fiber to be further described hereinbelow. As a non-limiting example, coal control antennas 10 are covered with red poly 12 on both sides and an overall gauge is 0.085"×12.5" in length. The width may be determined by using a finished belt width minus 4 inches. Other coverings and dimensions can be used as desired. For example, see FIG. 2 for sample dimensions. Typically, a repair stock, a compound needed dependent on conveyor belt construction (edge fill in stock at 0.085", cover fill in stock at about 12.5" wide and enough footage for required the inductive loops). Further, a small pressure roll 14 is required to remove air between antenna and sheet of cover rubber. A general purpose white compound 16 such as compound 5612 is needed to make letters for identification. Finally, one or more antenna detection testers or sensors 18 are used to certify loops after curing. See FIG. 3 for examples of these materials.

Due to installation of the antenna 10, the belt construction does not follow a normal structure. The cover designated to have the inductive loops installed, is typically calendared with a 0.062" skim pass, although other methods may be used as desired. This can be done with the same compound if desired, and a normal skim pass is not needed. For example, for calendaring, the cover pass may be produced for the antenna 10 to be installed wherein a bank coat tie ply compound to 0.062" is provided on fabric, allowed cool for 24 hours, and a skim coat carry cover compound is provided with remainder of gauge.

For the antenna 10 installation, (top ply with antenna 10 installed, for example), re-roll uncured conveyor belt 200 and stop at a desired length location (may be determined per customer antenna location requirements). Measure a width of the conveyor belt 200 and mark a center location (see FIG. 4). Utilize the antenna dimensions and mark and cut location to peel cover away from the belt 200 (see FIG. 5). Peel off the top cover. Do not cut skim off from the fabric. Since top cover is skim coated, it will be easily removed from skim (see FIG. 6). Remove poly 12 from one side of antenna 10. Mark center line with silver pen (see FIG. 7). Place antenna 10 in line with center mark with rubber side down (see FIG. 8). Using pressure roller 14, squeeze out trapped air between antenna 10 and skim, remove red poly 12 from second side of antenna 10 (see FIG. 9). Place 0.085" edge fill is stock or cover on both sides where the antenna 10 does not cover (see FIG. 10). Using pressure roller 14, remove trapped air. Place the cover sheet and remove trapped air by using the pressure roller 14 (see FIG. 11). Mark the location of the antenna 10 with 5612 white compound 16 letters. Prepare a thin sheet of 5612 compound at lab mil. Cut the length of antenna 10 (warp direction). Wrap around one side of edge. This will help customer to visually locate the antenna 10 when they need to replace it (see FIG. 12). Installation of the antenna 10 is now complete. Belt 200 can now be cured at a press, for example.

Figure 13:
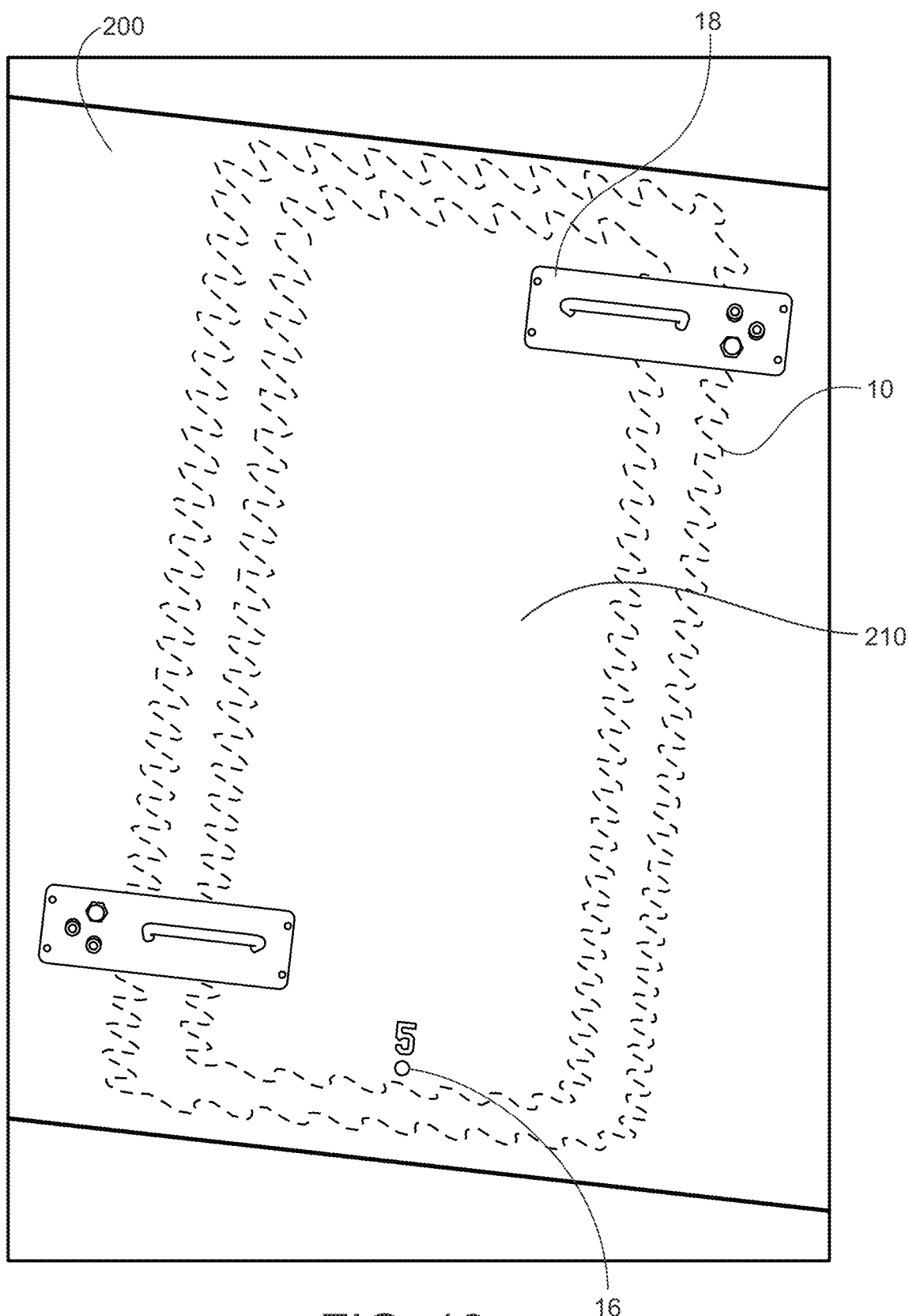
Figure 14:
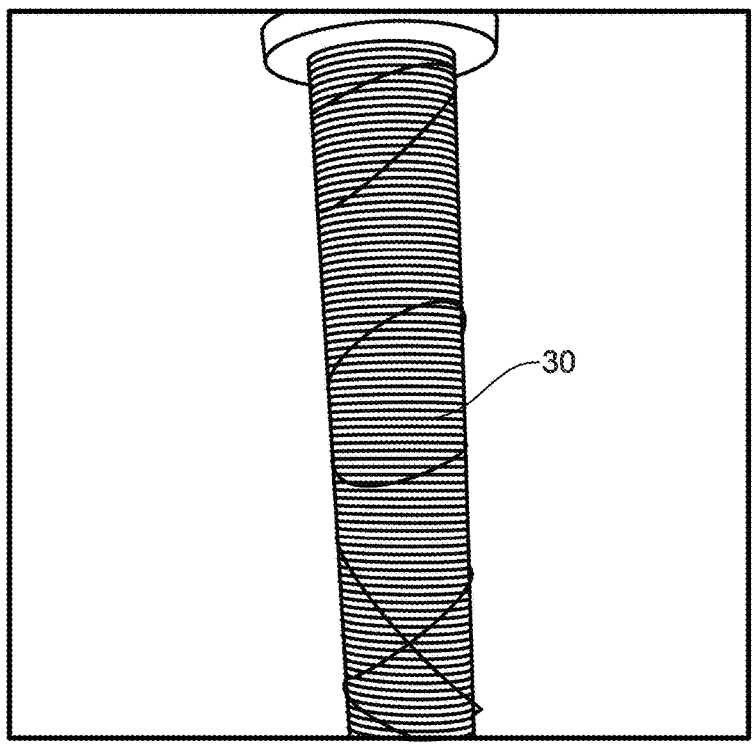
FIG. 14 shows a conductive fiber material used to form an antenna according to embodiment of the disclosure.
Figure 15:
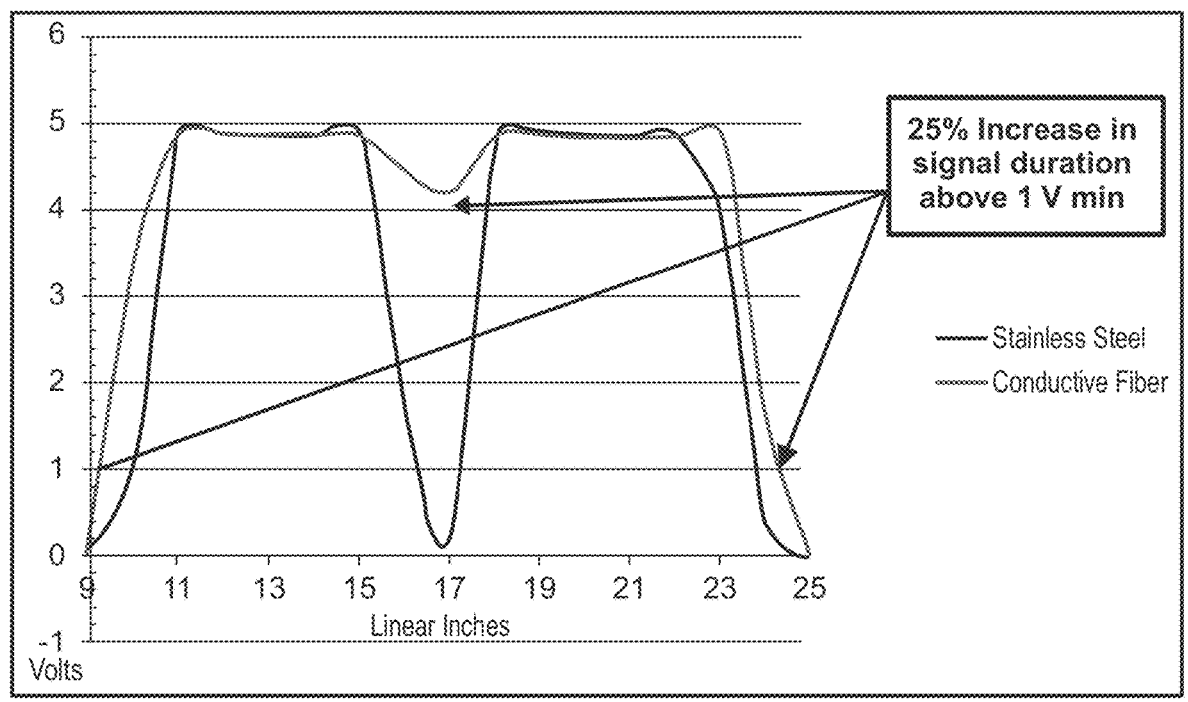
Figure 16:
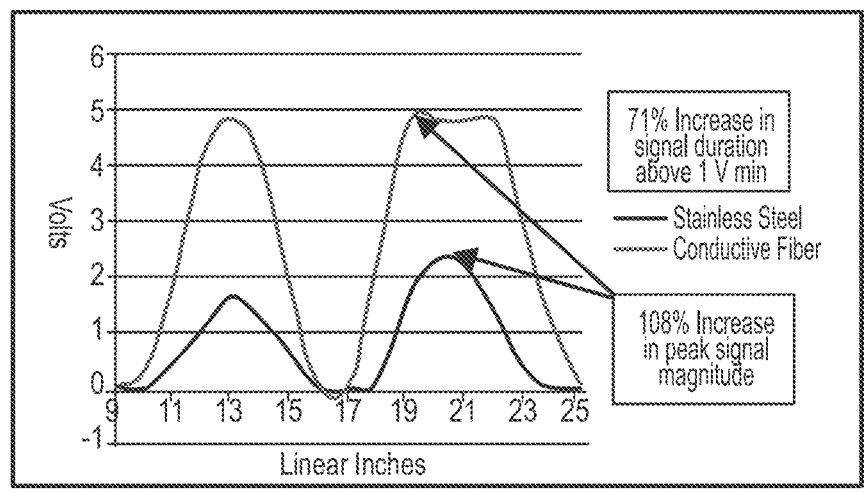
Figure 17:
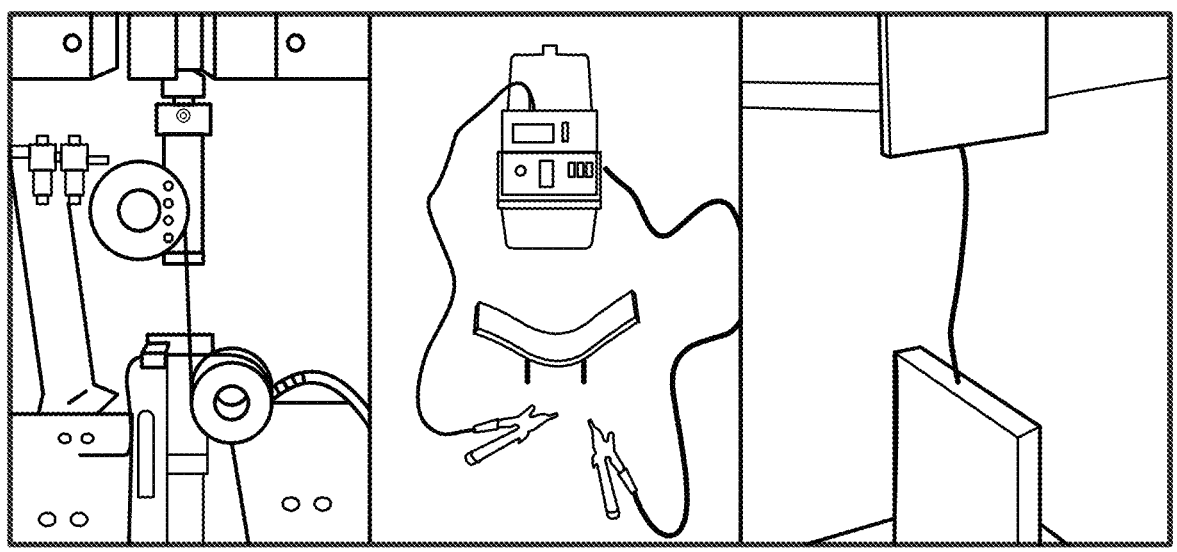

Once the belt 200 is cured with the antenna 10, the inspection operator check to ensure the antenna 10 is installed properly using the testing device (see FIG. 13). Wireless transmitter sensors are placed at opposite ends of the antenna. The wireless transmitter sensors 18 acknowledge the "continuity" of the antenna with a green light on both sensors 18. Any conventional sensors 18 can be used. However, please note when alternate Rema Tester is used, the verified circuit will read "100" or above. Once tested and confirmed the antenna 10 is confirmed as properly installed. Inspection is completed for each inductive loop antenna 10 located in each portion of the conveyor belt 200.

For additional details on the antenna 10, details are included hereinbelow. The antenna 10 is formed by at least one conductive fiber loop. It is understood that the loop may be continuous and formed in any shape and configuration as desired. The conductive fiber 30 (shown in FIG. 14) of the present disclosure replaces what has typically been a stainless steel component in the prior art. After extensive experimentation, favorable results have been obtained using Zylon® PBO due to conductivity and durability. Effectively, the Zylon® PBO replaces the stainless steel loop with a similar configuration and operation integrity. Zylon® PBO fiber is composed of rigid molecular chains [poly(p-phenylene-2,6-benzobisoxazole)]. These fibers and filaments are characterized by high tensile strength (10 times higher than steel), excellent impact energy absorption (twice that of para-aramid), and exceptional thermal stability (limiting oxygen index of 68). Zylon® PBO fiber is available in chopped fiber, staple fiber, spun yarn, and continuous filament. The Lyofil 332 (AmberStrand-Z-332-Cu) metallized fiber is about 3000 Denier and supplied with a twist of 1.7 Turns Per Inch (TPI). The inventive process used 5 of the Lyofill fibers and twist them together at 1.8 TPI. We then take 6 of these 'plied' yarns and then twist them further at 1.9 TPI to form the cable cords. In total, 30 ends of the Lyofil 332 are combined to provide the conductivity and enhanced performance. Favorable results based upon experimentation have been obtained using this construction (see FIGS. 14-20).

In respect of flex and conductivity of antennas 10 of various materials, see hereinbelow. To prevent wires breaking off stainless steel flex samples, the lead wires were taped down. Of three samples, two were tested for conductivity after flexing. One had a broken cable inside the sample. Stainless steel flex tests survived with cable intact only 40% of the time. All of these samples were made with crimped stainless steel cables. Brass coated and conductive fiber 30 loop samples were all intact after flex. All samples showed reduced conductivity. Brass coated had less conductivity loss than the conductive fiber 30 loop samples (see FIG. 19).

Pullout tests samples were made with a single cable in a 9" long mold. The first pullouts were done pulling the cable through 100 mm of rubber (3024). Brass cable didn't have high enough tensile strength to pull the cable through without breaking, so all samples were pulled through 50 mm rubber. Stainless cable came out looking clean. The conductive fiber 30 loop and brass cables had much rubber residue remaining on cable. The brass coated cables had the highest pullout values (see FIG. 20).

In further testing, 1 million cycles were completed for the conductive fiber loop. No failure was noted. System remained functional.

In the end, the Zylon® R PBO conductive fiber 30 more than adequately replaces the stainless steel and surprisingly provides better results in respect of conductivity and durability.

Figure 21:
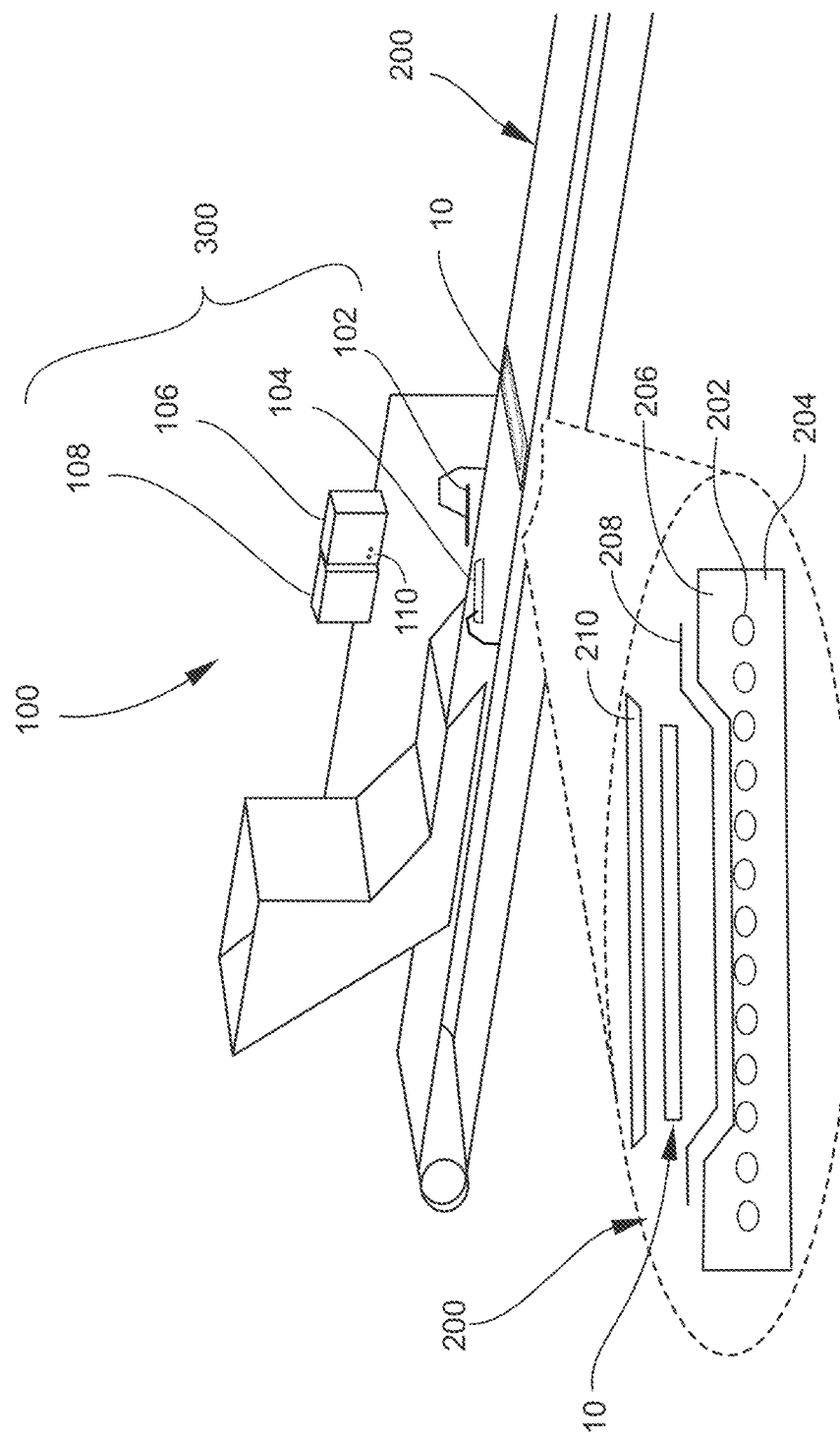
FIG. 21 shows a rip detection system including an antenna formed from at least a conductive fiber material.

Turning now to FIG. 21, an exemplary rip detection system 100 for a conveyor belt 200 is illustrated. In some embodiments, the rip detection system 100 includes at least one antenna 10 coupled to the conveyor belt 200 and a sensing system 300. As shown, the sensing system 300 may comprise a transmitter 102, a receiver 104, a controller 106, and a power source 108. Each of the transmitter 102 and the receiver 104 may in communication (wired or wireless) with the controller 106 and/or the power source 108 to transmit and/or receive signals and/or electrical current. Although the controller 106 and the power source 108 are shown as separate and distinct components of the sensing system 300, it is understood that the controller 106 and/or the power source 108 may be integrally formed with the transmitter 102 and/or the receiver 104 if desired. The sensing system 300 may be configured to sense the antenna 10 and detect a state of the conveyor belt 200. For example, the sensing system 300 senses a conductivity of the antenna 10 and the rip detection system 100 determines a state (e.g., ripped, worn, damaged, intact, acceptable, etc.) of the conveyor belt 200 based upon the conductivity of the antenna 10 sensed by the sensing system 300. In certain embodiments, when the conductivity of the antenna 10 being sensed is less than a predetermined level, the rip detection system 100 determines the state of the conveyor belt 200. As a non-limiting example, when the conductivity of the antenna 10 being sensed is about 0, the rip detection system 100 determines that the conveyor belt 200 is in a ripped state at or adjacent to a location of the antenna 10 being sensed. As another non-limiting example, when the conductivity of the antenna 10 being sensed is greater than 0, but less than the predetermined level, the rip detection system 100 determines that the conveyor belt 200 is in a damaged and/or worn state at or adjacent to the location of the antenna 10 being sensed. As yet another non-limiting example, when the conductivity of the antenna 10 being sensed is at least the predetermined level, the rip detection system 100 determines that the conveyor belt 200 is in an intact and/or acceptable state at or adjacent to the location of the antenna 10 being sensed. The rip detection system 100 may also include one or more indicators 110 configured to indicate to an operator the state of the conveyor belt 200. For example, the controller 106 may include a plurality of indicators 110 (e.g., red and green lights) to indicate the state of the conveyor belt 200. In some embodiments, the rip detection system 100 may include more or less components than shown if desired.

An exemplary embodiment of the conveyor belt 200 coupled to the antenna 10 is also illustrated in FIG. 21. In certain embodiments, the conveyor belt 200 may comprise a steel cord layer 202 having a carry cover 204 and a pulley cover 206 disposed on opposing sides thereof. A skim layer 208 may be disposed adjacent at least one of the steel cord layer 202 and the pulley cover 206. In certain embodiments, the antenna 10 is disposed adjacent the skim layer 208. An insert 210 (e.g., a rubber cover) may be disposed over and/or adjacent the antenna 10.

It is understood that the antenna 10 may be used in various other rip detection systems if desired.

It is also understood that the rip detection system 100 including the antenna 10 formed from at least a conductive fiber material 30 may be used with various other types of conveyor belts (e.g., a textile conveyor belt) if desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An antenna, comprising:
at least one loop formed from at least a non-woven fiber material, wherein the fiber material is comprised of a plurality of fibers twisted together to form a cable, wherein each of the fibers has a twist of at least 1.7 turns per inch, wherein at least five of the fibers are twisted together at least about 1.8 turns per inch to form a plied fiber, and wherein at least six of the plied fibers are further twisted together at least about 1.9 turns per inch to form the cable.

2. The antenna of claim 1, wherein the non-woven fiber material is conductive.

3. The antenna of claim 1, wherein at least one of the fibers is one of a poly(p-phenylene-2,6-benzobisoxazole) and a metal clad fiber.

4. The antenna of claim 1, wherein the cable has a serpentine shape.

5. A method of producing an antenna, comprising:
providing a non-woven fiber material, wherein the non-woven fiber material is comprised of a plurality of fibers twisted together to form a cable, wherein each of the fibers has a twist of at least about 1.7 turns per inch, wherein at least five of the fibers are twisted together at least about 1.8 turns per inch to form a plied fiber, and wherein at least six of the plied fibers are further twisted together least 1.9 aros per inch to form the cable; and
forming the non-woven fiber material into at least one loop.

6. The method of claim 5, wherein at least one of the fibers is one of a poly(p-phenylene-2,6-benzobisoxazole) and a metal clad fiber.

7. A rip detection system for a conveyor belt system, comprising:
at least one antenna configured to be coupled to a conveyor belt, wherein the at least one antenna is formed from at least a conductive non-woven fiber material, wherein the conductive non-woven fiber material is comprised of a plurality of fibers twisted together to form a cable, wherein each of the fibers has a twist of at least about 1.7 turns per inch, wherein at least five of the fibers are twisted together at least about 1.8 turns per inch to form a plied fiber, and wherein at least six of the plied fibers are further twisted together at least about 1.9 turns per inch to form the cable; and
at least one sensing system configured to detect a conductivity of the at least one antenna.

8. The rip detection system according to claim 7, wherein the at least one sensing system includes a controller configured to determine a state of the conveyor belt.

9. A method of producing a rip detection system for a conveyor belt system, comprising:
provides a conveyor belt;
providing at least one antenna formed from at least a conductive non-woven fiber material, wherein the conductive non-woven fiber material is comprised of a plurality of fibers twisted together to form a cable, wherein each of the fibers are twisted together at least about 1.7 turns per inch, wherein at least five of the fibers are twisted together at least about 1.8 turns per inch to form a plied fiber, and wherein at least six of the plied fibers are further twisted together at least about 1.9 turns per inch to form the cable; and
coupling the at least one antenna to the conveyor belt.

10. The method of claim 9, further comprising providing at least one sensing system configured to sense a conductivity of the at least one antenna to determine a state of the conveyor belt.

* * * * *